United States Patent [19]

Kennedy

[11] Patent Number: 5,026,317
[45] Date of Patent: Jun. 25, 1991

[54] VISCERA EXCISION FOR POULTRY AND THE LIKE

[76] Inventor: Claude D. Kennedy, 310, Grande-Ligne, Iberville Québec J2X 4J2, Canada

[21] Appl. No.: 496,292

[22] Filed: Mar. 20, 1990

[51] Int. Cl.⁵ .......................................... A22C 21/00
[52] U.S. Cl. ................................ 452/106; 452/117; 452/179
[58] Field of Search ............. 452/106, 118, 111, 112, 452/117, 179, 122

[56] References Cited

U.S. PATENT DOCUMENTS

| | | | |
|---|---|---|---|
| 3,983,601 | 10/1976 | Verbakel | 452/118 |
| 3,986,231 | 10/1976 | Harben, Jr. | 452/118 |
| 4,262,387 | 4/1981 | Scheier et al. | 452/117 |
| 4,266,322 | 5/1981 | van Mill | 452/122 |

Primary Examiner—Willis Little
Attorney, Agent, or Firm—Roland L. Morneau

[57] ABSTRACT

An assembly for excising viscera hanging from a poultry suspended vertically consists in a structure which tilts the poultry from a vertical position to a horizontal position, pulls, in a substantial horizontal direction on the proventriculus and cuts the latter while the poultry moves sideways on a conveyor.

8 Claims, 4 Drawing Sheets

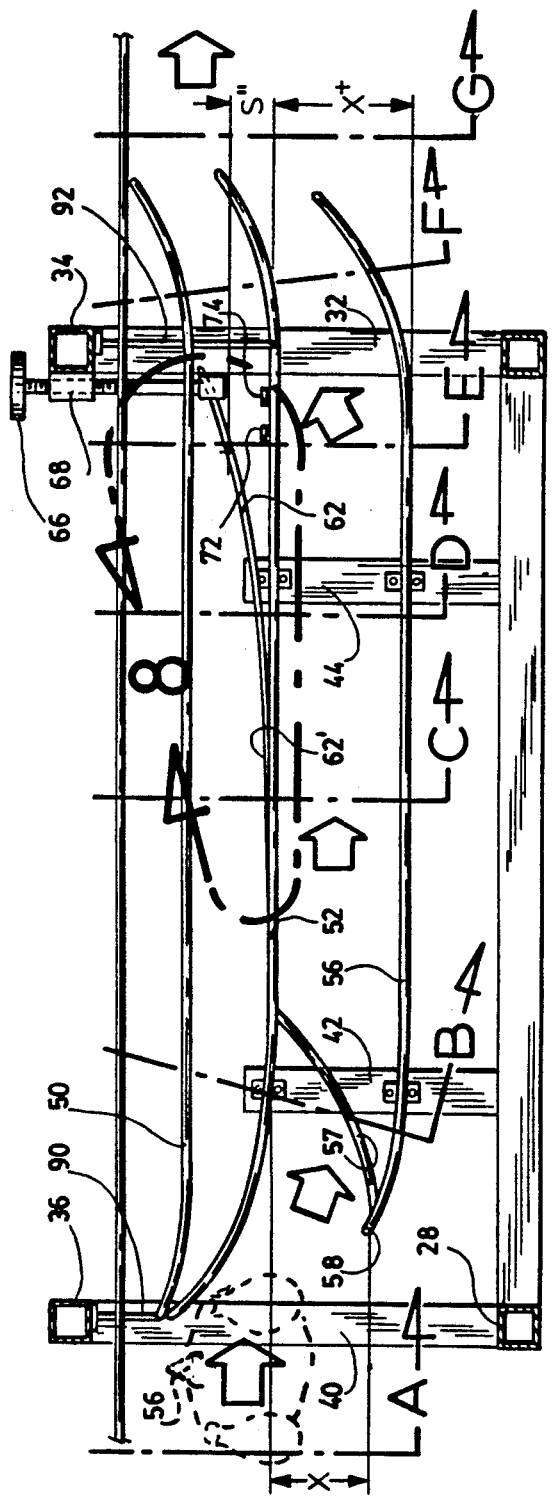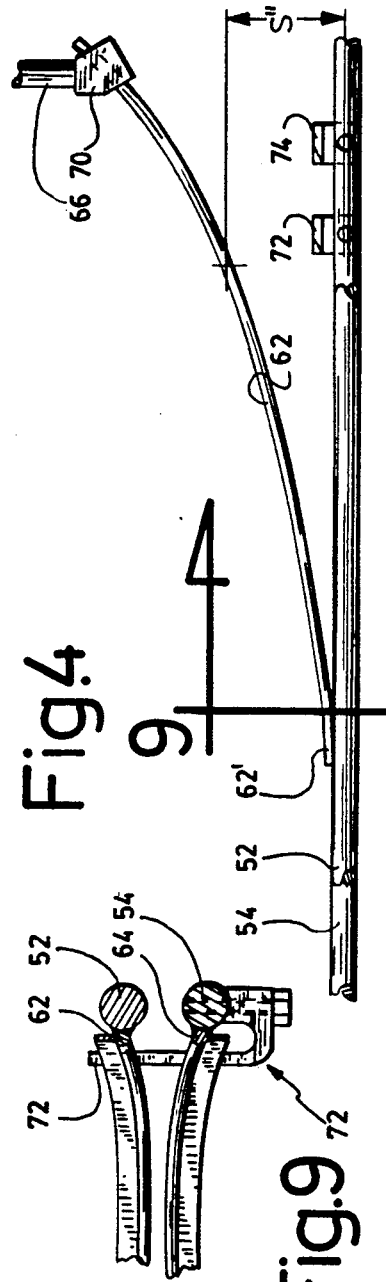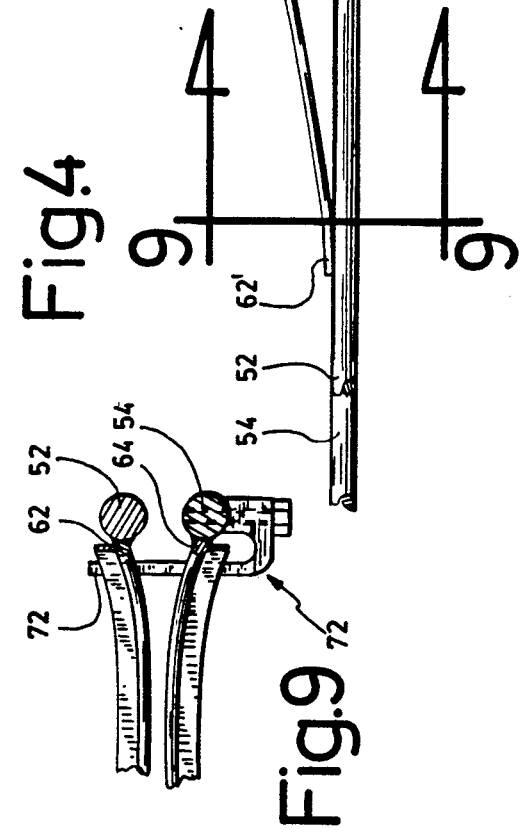

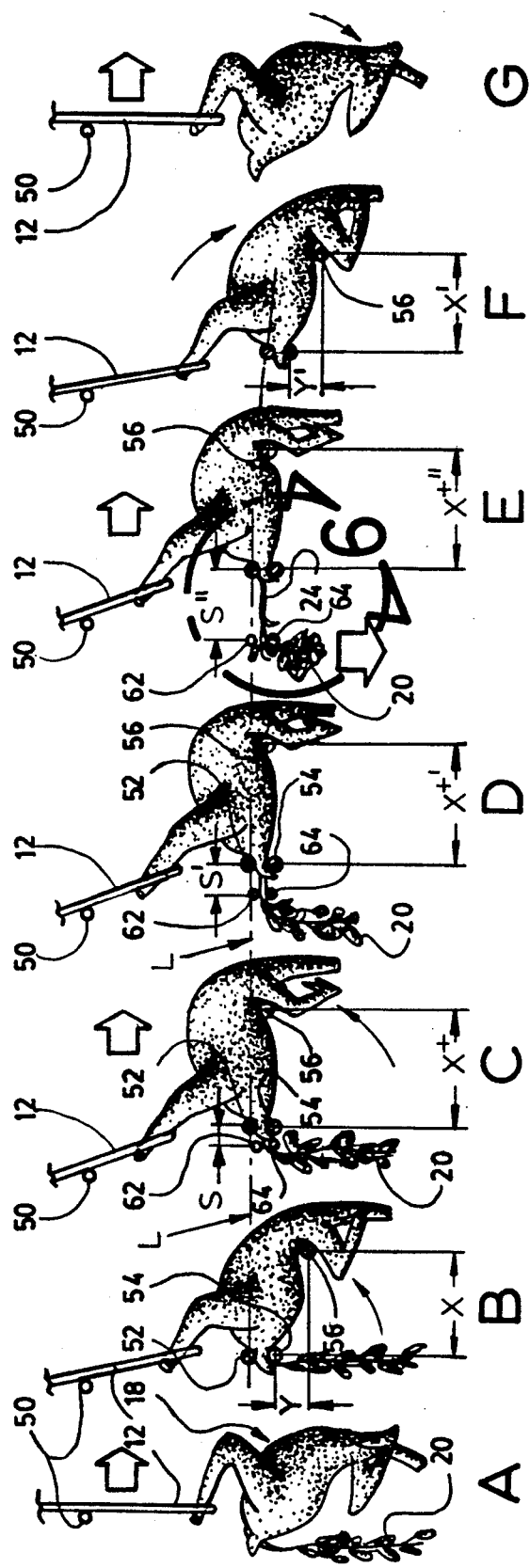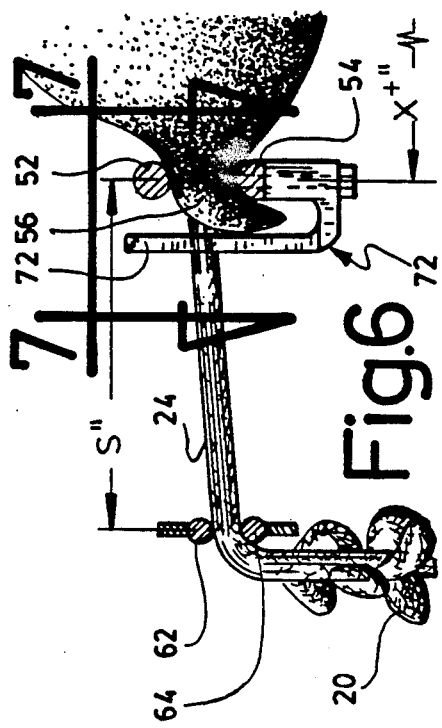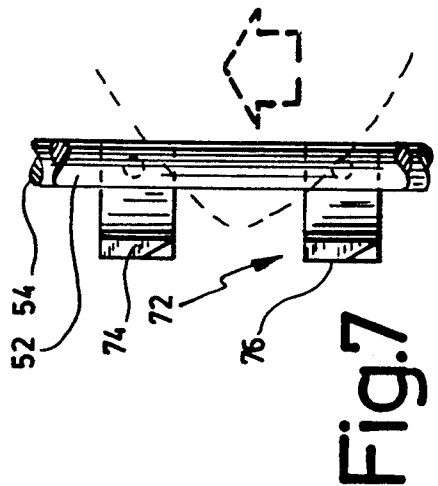

VISCERA EXCISION FOR POULTRY AND THE LIKE

BACKGROUND OF THE INVENTION

1. Field of the invention:

The invention is directed to a method and apparatus for removing and particularly for cutting the viscera off the poultry when the viscera are hanging out of the carcass or body of the poultry.

In the process of cleaning and preparing poultry for human consumption, the birds are hung by the legs and laterally moved along a horizontally disposed guide bar. The birds are subsequently defeathered and operated on by various automatic machines which remove parts of the body of the birds, opens the abdominal cavity and pulls out the internal organs. Some of the organs, such as the liver, and the heart are selectively cut and recuperated. The remaining parts such as the gizzard, intestines and bowels are pulled away or cut off from the body. The present application is particularly directed to this last operation and, in particular, to the method and apparatus for accomplishing this operation. For accomplishing this operation, the bird is brought to a horizontal position which facilitates the removal operation, and reduces the danger of contamination compared to the vertical position.

2. Prior Art:

Although the viscera have been manually cut off in the past, an automatic machine is cheaper and preferred.

The Cantrell Machine Co. Inc. of Gamesville, Ga. produces a machine referred to as EH-20 which is adapted to extract the viscera from inside the body of the poultry and pull them off. This machine generally operates as follows.

It is adapted to operate on birds hanging vertically, from the back of their legs, hooked in shackels and retained therein by a guide bar. The birds, having an opening in their abdominal cavity, are transported in front of a large rotating wheel tilted relative to the plane of the moving birds. The wheel is provided with a plurality of arms radially projecting at its periphery. Each arm has an off-center enlarged head. During rotation of the wheel, each arm is introduced in the cavity of a bird passing by. At that stage, the arm is twisted so that the enlarged head of the arm grabs the proventriculus and uses it to pull out the viscera and subsequently extract them from the body of the bird. Such a machine is complex and requires precise adjustment of the arms relative to the shackles and the birds. Further adjustments are needed depending on the sized of the birds. It has also been found that the introduction of the Cantrell's arms inside the body of the birds constitute a foreign matter which can lead to the transfer of bacteria from one bird to another.

SUMMARY OF THE INVENTION

The invention is characterized by an assembly for excising viscera hanging outside by the proventriculus outside the body of a poultry vertically suspended by the legs from a shackle moving sideways along a substantially planar path on a conveyor tracks. The poultry has wings hanging from the body. The assembly comprises, guide rails longitudinally disposed adjacent and along the planar path. The rails are located on the side of the body corresponding to the side of the hanging viscera and across a part of said body, substantially above the wings.

The rails extend away from the planar path and upwardly in the direction of movement of the shackle. The rails are adapted to raise the wing part of the body and provide a substantially horizontal position to the poultry while maintaining the viscera hanging from said body. Guides are provided to pull the viscera away from said body for stretching the proventriculus. Cutting blades are disposed between the viscera and the body at a level corresponding to the proventriculus, whereby the sideways movement of the proventriculus across the cutting blades causes the excising of the viscera from the body.

BRIEF DESCRIPTION OF THE DRAWINGS

FIG. 4 is a top view taken along line 4—4 of FIG. 1;

FIG. 5 are sequential views of the poultry taken along lines A, B, C, D, E, F and G of FIG. 4;

FIG. 6 is an enlarged view of encircled portion 6 of FIG. 5;

FIG. 7 is a top view of the cutting arrangement taken along line 7—7 of FIG. 6;

FIG. 8 is an enlarged view of encircled portion 8 of FIG. 4; and,

FIG. 9 is a cross-sectional view taken along line 9—9 of FIG. 8.

DETAILED DESCRIPTION OF THE INVENTION

Figure 1:
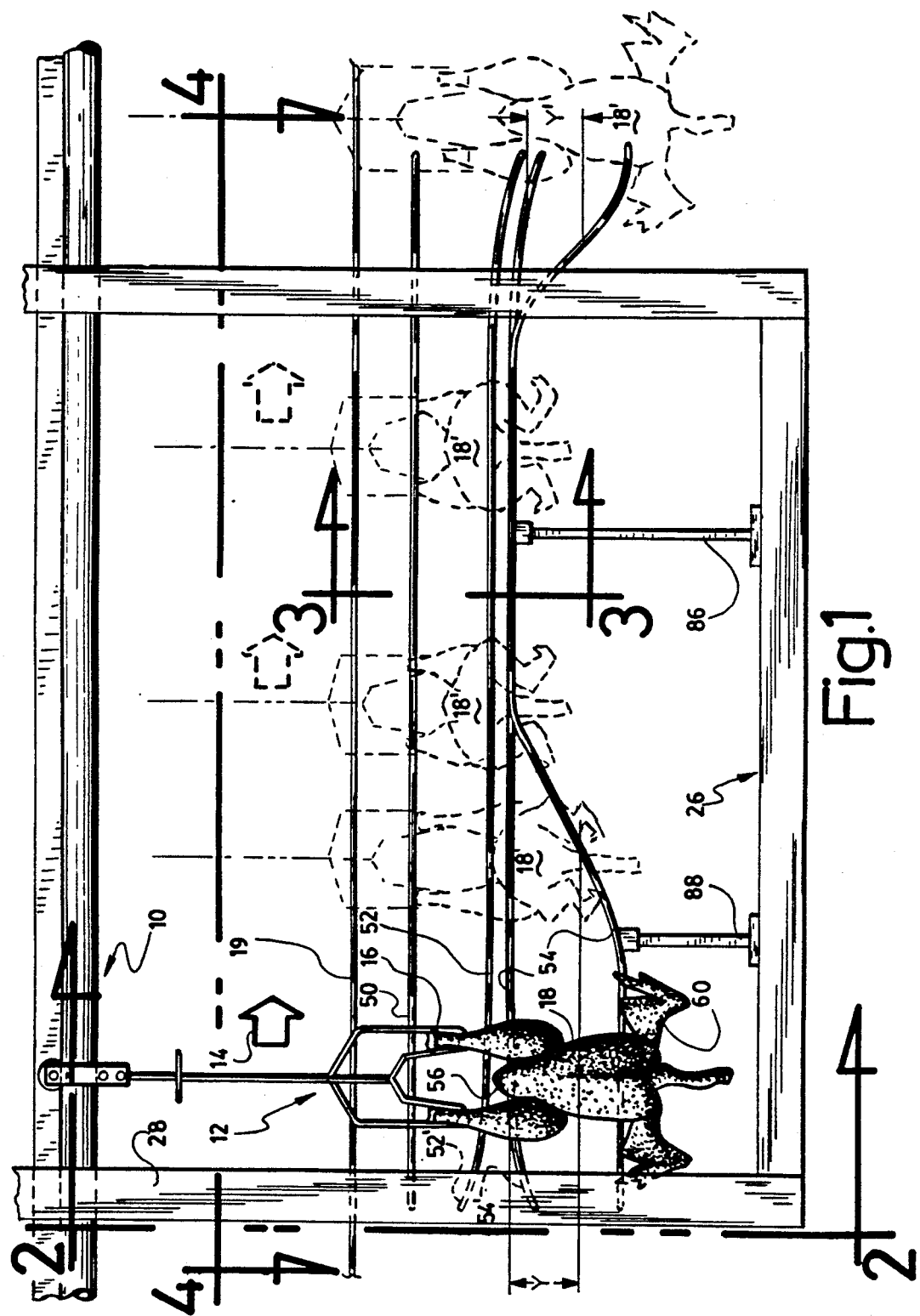
FIG. 1 is a front view of the viscera excision assembly, according to the invention, mounted in front of a conveyor for suspended poultry.

The process of preparing poultry for human consumption from the feathering step to steps before packaging usually takes place along a conveyor line 10 supporting a plurality of adjacent shackles 12 adapted to move in the direction of arrow 14. The lower end of each shackle 12 is usually made of a wire having a generally W-shape forming a pair of stirrups 16 through which a poultry 18 hangs by the joints of the legs. This arrangement is conventional and well known. The shackle 12 is maintained in a planar path by a conventional guide bar 19. Along the above-mentioned steps, the poultry reaches a stage where viscera 20 hang out of the body adjacent the back 22 of the poultry 18.

The applicant's invention consists in providing a structure mounted along the lateral or sideways movement of the poultry which tilts the latter in a substantially horizontal position, pulls on the proventriculus 24 from which the viscera hang and cuts the proventriculus to let the viscera drop into a gizzard harvester (not shown).

The applicant's structure comprises a rigid frame made of outer beams, such as 28, 30, 32-44 surrounding and supporting the assembly for excising viscera from the body of a poultry. The assembly includes a rod 50 which is curved at both ends between the beams 40 and 32, the curvature of the rod 50 projecting forwardly so as to push the shackle 12 forwardly, that is, away from the plane formed by the beams 36 and 34. When pushed forwardly by the rod 50, the shackle 12 takes the position shown by the dotted lines 12 in FIG. 2.

The assembly, according to the invention, also includes a pair of rods 52 and 54 longitudinally extending along the passage of the poultry 12 at a level lower than the rod 50. The two rods 52 and 54 are generally parallel with each other, and slightly spaced to allow the rear end or tail 56 of the poultry to engage between them. In order to facilitate the introduction of the tail 56 between the rods 52 and 54, the latter spreads away from each other at position 52' and 54'. As seen in FIG. 4, the rods 52 and 54 are superposed one over the other and are forwardly curved at both ends so as to project further in front of the rod 50.

Figure 3:
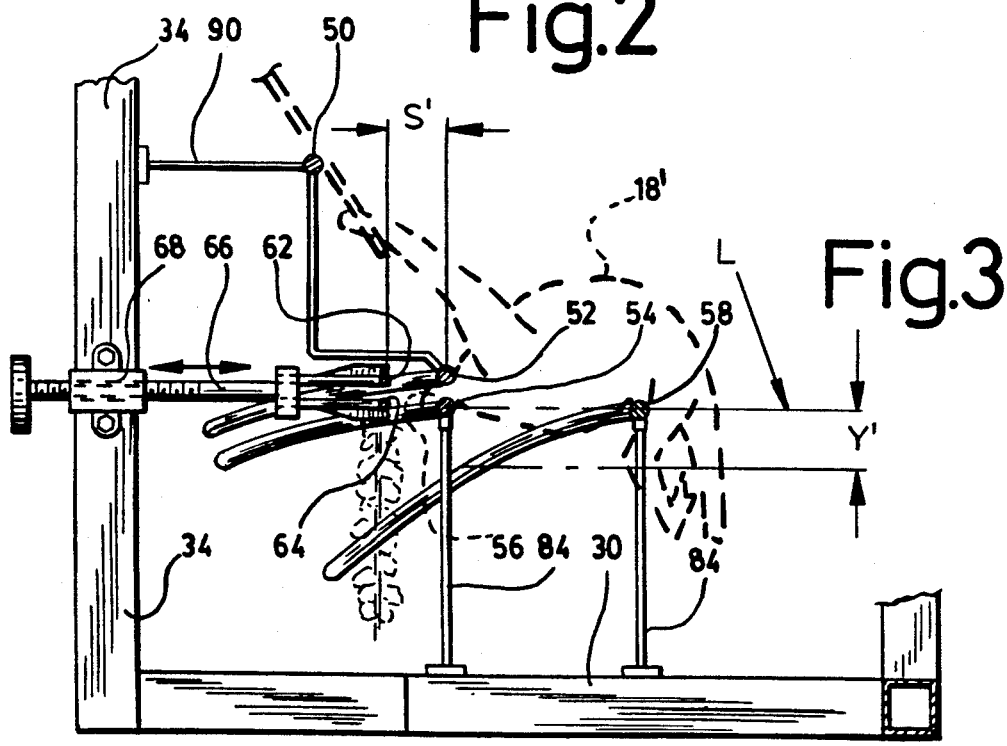
FIG. 3 is a cross-sectional view of FIG. 1 taken along line 2—2.

Soon after the shackle 12 has been projected forwardly by the rod 50 and the tail 56 also slightly pushed forwardly by the rods 52 and 54, the back 22 of the poultry engages over a rod 56 at point 58. The rod 56 is located further down from the rods 52 and 54 substantially corresponding to a level above the wings 60 of the poultry. From the point 58, the rod 56 simultaneously rises and projects forwardly to bring the back 22 of the poultry in a substantially horizontal position 12, as shown in FIG. 3. In that latter position, the poultry rests on the rod 58 while the tail 56 is engaged between the two rods 52 and 54. When the poultry has reached its position 18', the rod 58 has reached its foremost and uppermost position and becomes substantially at the level of rod 54, as seen in FIGS. 1 and 3.

The conveyor 10 with the shackle 12 keeps the poultry moving in the direction of the arrow 14 till it reaches another pair of rods 62 and 64. Each of the rods 62 and 64 originates in contact at point 62' and 64' respectively with rods 52 and 54 and spreads away from the latter in a backward direction towards the plane formed by the beams 34 and 36. The purpose of the rods 62 and 64 is to engage the proventriculus 24 and stretch it away from the tail 56 while the rods 62 and 64 are spreading away from the rods 52 and 54. FIG. 3 illustrates a stage slightly after a proventriculus has been engaged by the rods 62 and 64. An adjusting device is provided to adjust the spreading of the rods 62-64 from the rods 52-54. The adjustment is made by a screw 66 mounted on columns 34 and threadedly engaged in a sleeve 68 for pulling or pushing on a holder 70 which rips the tip end of the rods 62 and 64. This adjustment varies the distance S from S to S' and to S" (see FIG. 5).

A pair of cutting blades 72 and 74 are successively mounted on the rod 54. The blade 72 has a cutting edge 76 which is located behind the plane formed by the two rods 52 and 54 and spaced therefrom to allow the tail 56 to remain unmutulated by the blade 76. The horizontal orientation of the poultry allows the tail 56 to curve downwardly and to cut the proventriculus 24 closely adjacent the tail 56. Only one cutting blade may be used but two blades are illustrated and generally used to make sure the excision has been completely performed. This double safety precaution is needed in case one of the cutting edge becomes dull.

After the proventriculus 24 has been cut away from the poultry, the viscera 20, including gizzard drops freely into a collecting tank (not shown).

After the proventriculus 24 has been cut, the poultry proceeds further along the arrow 14 through the conveyor 10 to return to its vertical position, as shown in FIGS. 1 and 5. For this purpose, the rods 50, 52-54 curve backwardly towards the plane of the beams 36-34 and the rod 56 simultaneously curves backwardly like the latter mentioned rods and simultaneously curves downwardly to substantially return to a level corresponding to an initial level of the rod 58.

As shown in FIG. 9, the rods 62 and 64 are additionally provided with a reinforcing rib 80 and 82, respectively to add and combine rigidity and flexibility to the rods 62 and 64.

The continuity of operation of the assembly, according to the applicant's invention, is particularly illustrated in FIG. 5 for each of the sectional views A-G shown in FIG. 4. In section A, the poultry 18 hangs freely from the shackle 12 while the viscera 20 hangs downwardly against the back of the poultry. In section B, the rod 50 has pushed forwardly the shackle 12, the tail of the poultry is guided by the rods 52-54 and the rod 56 has started to raise the poultry towards its horizontal position.

Along the section C, the rod 56 has reached its uppermost position which is substantially at the same level as the rod 54 which has brought the poultry in the desired horizontal position for the excision. As seen from the coordinates between section B and C the height Y is nil in section C and the horizontal axis C has increased to X+. Furthermore, in section C, the rods 62 and 64 have engaged above and below the proventriculus.

In section D, the rod 62 and 64 have started to spread away from the rods 52 and 54 which is characterized by the letter S'. In section E, the rod 62-64 have fully stretched the proventriculus 24 to a distance of S". The stage corresponding to the E is particularly illustrated in FIG. 6 and illustrates the cutting blade 72 reaching the proventriculus 24. It can be seen that the tail 56 of the poultry curves downwardly to take as little horizontal space as possible to allow the cutting edge 76 to perform the excision as closely as possible to the tail 56.

In section F, the poultry is freed of the viscera and proventriculus and its body has started to tilt downwardly due to the lowering of the rod 56. The vertical axis Y' increases while the horizontal axis X' reduces till it reaches the final stage of section G.

The tilting of the body of the poultry towards a horizontal position is needed to be able to cut off the viscera cleanly, effectively and as closely as possible to the tail of the poultry without cutting or damaging the latter.

Figure 2:
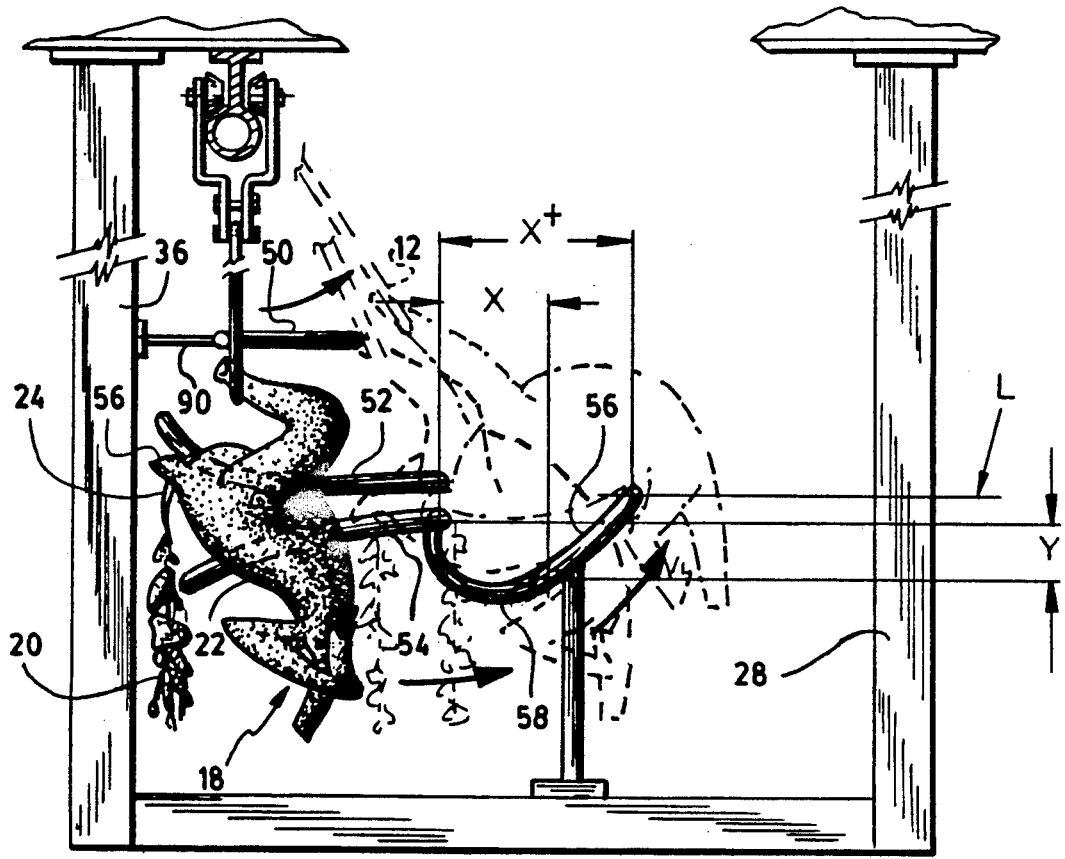
FIG. 2 is a side view of FIG. 1 taken along line 2—2.

The assembly explained above which is essentially constituted of rods extending between an initial and final position of the desired operation, needs a supporting structure which may be provided at both ends of the rods or at an intermediate position. Rod 50 is supported at both ends to the beams 36 and 34 as well as the rods 52-54. The curve of the rods 52-54 being greater than of the rod 50, spread away further from the beams 36 and 34. For this reason they are provided with intermediate supports extending from a pair of intermediate beams 42 and 44. FIG. 3 illustrates column 84 supporting rods 52-54 and column 86 supporting the rod 58. In the illustration of FIG. 1, column 88 supports the rod 58 while the rods 52-54 are supported by the column 86. FIGS. 2, 3 and 4 illustrate reinforcing rod 90 which connects the right hand of the rod 50 and 52 to the rear beams 34 and 36.

In order to provide an additional support to the body of the poultry, while the latter reaches its horizontal position while sliding in the early part of the rod 56, and interconnecting rod member 57 preferably extends between point 58 of rod 56 to the lower rod 54 of the assembly.

I claim:

1. An assembly for excising viscera hanging by a proventriculus, on the back of a poultry body vertically suspended by the leg from a shackle moving sideways along a substantially planar path on a conveyor track, said assembly adapted to be mounted adjacent said planar path, said assembly comprising:
- first guide rail means substantially parallel to said planar path and located at a level corresponding to the upper part of said body,
- second guide rail means located across a transversal part of said body generally above the wing of the poultry, said second guide rail means horizontally extending in the direction of movement of the shackle, said second guide rail means adapted to raise said transversal part of the body and lift the poultry in a substantially horizontal position while said upper part of said body abuts against said first guide rail means.
- third guide rail means horizontally extending from said first guide rail means towards said path for pulling said viscera away from said upper part of said body for stretching said proventriculus during the sideway movement of the poultry, when the latter has reached its horizontal position,
- cutting means mounted on said first rail means at a location corresponding to the stretched proventriculus and adjacent the latter for excising the viscera from the body.

2. An assembly as recited in claim 1 comprising a fourth guide rail means for forwardly projecting the shackle supporting the poultry in a direction opposite the back of the vertically suspended poultry.

3. An assembly as recited in claim 1, wherein said first guide rail means comprises a pair of spacedly superposed rod members for allowing the upper part of said body to abut thereagainst and vertically maintain said upper part, during the sideway movement of the poultry.

4. An assembly as recited in claim 3, wherein said second guide rail means comprises a curved guiding rod having an initial forward and upward projection adapted to maintain a supporting contact with said body during the lifting of the latter in a horizontal position, said curved guiding rod subsequently curving downwardly and rearwardly for supportingly bringing said body to a vertical position along said planar path.

5. An assembly as recited in claim 4, wherein said third guide rail means comprises a pair bifurcating rod members extending from said superposed rod members in a direction away from said superposed rod members, said bifurcating rail members adapted to initially engage said proventriculus between said viscera and said upper part.

6. An assembly as recited in claim 4, wherein said second guide rail means comprises an interconnecting rod member between said initial projection and one of said superposed rod members for providing a temporary support to the body of the poultry between the vertical and the horizontal position of the poultry.

7. An assembly as recited in claim 5, wherein said cutting means comprises a blade having a cutting edge fixed between said spacedly superposed rod members and said bifurcated rod members and adjacent the former, said cutting edge being upwardly oriented to slice the proventriculus during the sideway movement of the latter over the blade.

8. A method for excising proventriculus and viscera from a vertically suspended poultry which comprises:
- tilting said poultry in a horizontal position for allowing said viscera to vertically hang at one end of the poultry from the proventriculus, said tilting being provided by pushing upwardly on the back of the poultry until said back is in a substantially horizontal position and said viscera is out of contact from said back,
- horizontally stretching said proventriculus away from said poultry,
- cutting said proventriculus adjacent said body while the latter is in its stretched position, and
- returning said poultry in its vertically suspended position.

* * * * *